US008755648B1

(12) United States Patent
Sayyah

(10) Patent No.: US 8,755,648 B1
(45) Date of Patent: Jun. 17, 2014

(54) SEMICONDUCTOR-BASED PLASMONIC PHASE MODULATOR AND METHOD

(75) Inventor: Keyvan Sayyah, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 954 days.

(21) Appl. No.: 12/645,929

(22) Filed: Dec. 23, 2009

(51) Int. Cl.
*G02B 6/26* (2006.01)
*G02B 6/42* (2006.01)

(52) U.S. Cl.
USPC .......................................................... 385/30

(58) Field of Classification Search
USPC ............................................................ 385/30
See application file for complete search history.

(56) References Cited

U.S. PATENT DOCUMENTS

| | | | |
|---|---|---|---|
| 4,583,818 | A | 4/1986 | Chen et al. |
| 6,178,275 | B1 | 1/2001 | Nerses et al. |
| 7,010,183 | B2 | 3/2006 | Estes et al. |
| 7,026,701 | B2 | 4/2006 | Scales et al. |
| 2003/0206708 | A1* | 11/2003 | Estes et al. ................. 385/130 |
| 2008/0285917 | A1* | 11/2008 | Bratkovski et al. .......... 385/30 |
| 2009/0052827 | A1 | 2/2009 | Durfee et al. |
| 2009/0315075 | A1* | 12/2009 | Sato ........................... 257/192 |
| 2010/0084276 | A1* | 4/2010 | Lindsay ....................... 205/93 |
| 2010/0278474 | A1* | 11/2010 | Beausoleil et al. ............ 385/2 |

OTHER PUBLICATIONS

J. A. Dionne et al., "Planar metal plasmon waveguides: frequency-dependent dispersion, propagation, localization, and loss beyond the free electron model," Physical Review B 72, 075405, 2005, pp. 075405-1 to 075405.

Domenico Pacific et al.,"All-optical modulation by plasmonic excitation of CdSe quantum dots," Nature Photonics, vol. 1, Jul. 2007, pp. 402-406.

Harry A. Atwater, "The New "p—n Junction": Plasmonics Enables Photonic Access to the Nanoworld," MRS Bulletin, vol. 30, May 2005, pp. 385-389.

Stefan A. Maier et al., "Plasmonics: Localization and guiding of electromagnetic energy in metal/dielectric structures," Applied Physics Reviews—Focused Review, Journal of Applied Physics 98, 011101, 2005, pp. 011101-1 to 011101-10.

Harry A. Atwater, "Guiding Light," Micro/Nano Lithography & Fabrication, oemagazine, Jul. 2002, pp. 1-6.

A. E Neeves et al., "Composite structures for the enhancement of nonlinear-optical susceptibility," J. Opt. Soc. Am. B, vol. 6, No. 4, Apr. 1989, 787-796.

Charles G. Durfee et al., "Ultra-long Range Surface Plasmon Structures for Plasmonic Devices," Conf. on Lasers and Electro-Optics, CLEO 2007, May 6-11, 2007, pp. 1-2.

* cited by examiner

*Primary Examiner* — Jerry Blevins

(74) *Attorney, Agent, or Firm* — North Shore Associates

(57) ABSTRACT

A plasmonic phase modulator and a method of phase modulation employ modulation of surface plasmons. The plasmonic phase modulator includes a semiconductor substrate configured to provide a surface charge that forms a plasmonic channel at the substrate surface. The modulator further includes an electrode and an insulator between the electrode and the semiconductor substrate. The electrode is configured to provide an electric field that influences the surface charge. The electric field includes a bias field component and a modulation field component. The surface plasmon is supported within the plasmonic channel at an interface between the semiconductor substrate surface and the insulator. A phase of the surface plasmon in the plasmonic channel is modulated by changes in the electric field. The method includes propagating the surface plasmon in the plasmonic channel and varying the modulation field component to modulate the phase of the propagating surface plasmon.

15 Claims, 3 Drawing Sheets

SEMICONDUCTOR-BASED PLASMONIC PHASE MODULATOR AND METHOD

CROSS-REFERENCE TO RELATED APPLICATIONS

N/A

STATEMENT REGARDING FEDERALLY SPONSORED RESEARCH OR DEVELOPMENT

N/A

BACKGROUND

1. Technical Field

The invention relates to photonic devices. In particular, the invention relates to photonic devices that use surface plasmons.

2. Description of Related Art

A consistent trend in integrated circuits (ICs) is toward an increase in data rate or equivalently an increase in bandwidth of data channels within the IC. Concomitant with the increased bandwidth is a desire to reduce an overall size of the IC, which typically has included pressure to decrease a size of individual components that make up portions of the IC. Photonics, the use of optical signals for processing and transporting data in ICs, has been developed to facilitate much higher bandwidths than is possible with more conventional, purely electronic ICs. However, photonic components often require considerably larger dimensions or surface real estate on the IC than functionally equivalent electronic components. Relatively recently the use of surface plasmons in place of or in conjunction with conventional optical signals in photonic ICs has attracted a great deal of interest. A surface plasmon at a given frequency generally has a wavelength that is considerably smaller than a wavelength of an optical signal in free space or a dielectric waveguide at the same frequency. As such, photonic components based on surface plasmons may be much smaller than similar purely conventional photonic components.

A principle component of many photonic ICs is a modulator. A modulator is used to vary or modulate an intensity and/or a phase of a signal passing through the modulator. For example, a modulator may be used to impress a data stream onto an optical signal acting as a carrier to facilitate transmitting the data stream from one point to another either within an IC or between ICs or other photonic system elements. Plasmonic modulators based on changing a phase of gallium (Ga) metal used to support propagation of a surface plasmon have been demonstrated. The phase change (e.g., between a solid $\alpha$-Ga phase and a metallic Ga liquid phase) is induced by changing a temperature of the Ga metal. Another approach is based on modulating guided long range surface plasmon polaritons (LRSPPs) by either heating a polymer dielectric layer to induce loss in the propagating plasmon mode or employing a Mach-Zehnder (MZ) interferometer and using heat via a thermo-optic effect to change a phase length of one arm relative to another arm of the MZ interferometer to affect plasmon modulation.

However, these plasmonic modulators generally cannot achieve sufficient modulation bandwidths to be useful for high bandwidth application (e.g., data rates above 10 GHz). As such, there is considerable interest in providing means for modulating surface plasmons that will facilitate high data rate modulation. Providing such means would satisfy a long felt need.

BRIEF DESCRIPTION OF THE DRAWINGS

The various features of embodiments of the present invention may be more readily understood with reference to the following detailed description taken in conjunction with the accompanying drawings, where like reference numerals designate like structural elements, and in which.

DETAILED DESCRIPTION

Figure 1:
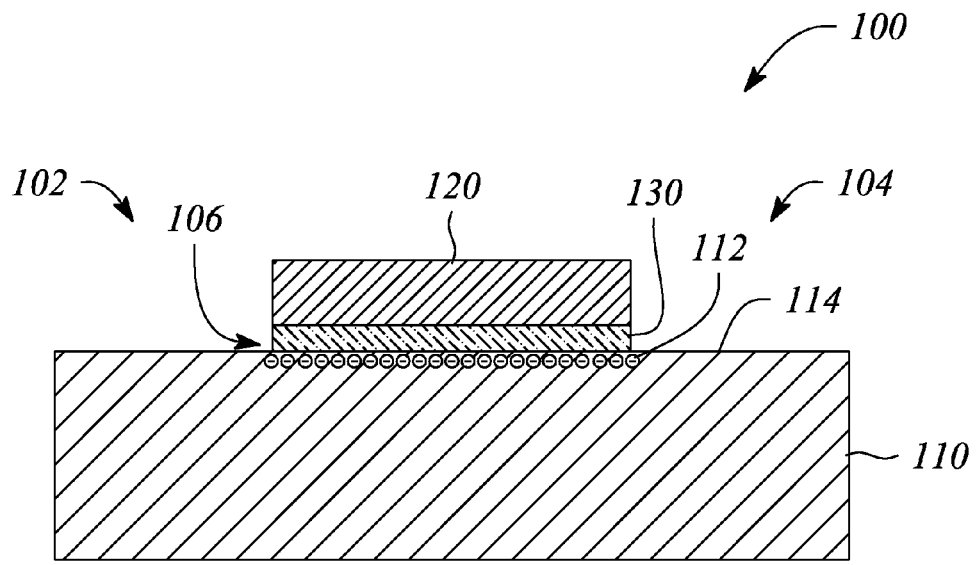
FIG. 1 illustrates a cross sectional view of a plasmonic phase modulator, according to an embodiment of the present invention.

Embodiments of the present invention facilitate phase modulation of a propagating surface plasmon. In particular, embodiments of the present invention provide a plasmonic channel comprising a surface charge at an interface between a semiconductor and an insulator (e.g., a dielectric adjacent to a surface of the semiconductor). The plasmonic channel supports the propagating surface plasmon. The plasmonic phase modulator varies or modulates a density of the surface charge about a bias point of the surface charge that forms and maintains the plasmonic channel. The modulation of the surface charge density about the bias point, in turn, modulates a phase of a surface plasmon propagating in the plasmonic channel. As such, the plasmonic modulator is essentially a semiconductor-based plasmonic phase modulator, according to the embodiments of the present invention.

In various embodiments, the plasmonic phase modulator of the present invention may be implemented with sub-wavelength dimensions. For example, in some embodiments, the plasmonic phase modulator is useful for optical wavelengths of about 1.5-1.6 microns ($\mu m$). According to these embodiments, the plasmonic phase modulator may be implemented having dimensions of less than about 1 $\mu m$ in length and less than about 0.5 $\mu m$ in width, for example. The sub-wavelength dimensions and the plasmonic phase modulator being semiconductor-based enable sub-wavelength-scale data links to be realized in photonic and plasmonic integrated circuits (ICs) that employ semiconductor substrates for active elements and optical waveguides, for example.

Various embodiments the plasmonic phase modulator, according to the present invention, comprise a semiconductor substrate having a surface at or defined by an interface between the semiconductor and an insulator (e.g., a dielectric or a vacuum). The various embodiments generally employ an ability of a surface charge at the semiconductor substrate surface (i.e., the semiconductor-insulator interface) to support a surface plasmon. According the various embodiments, an electric field is employed to influence a surface charge density of the semiconductor substrate at the surface. The electric field may be controllably varied in one or both of polarity and intensity. The controllably varied electric field both establishes or forms the plasmonic channel and controllably modulates the surface charge density within the formed plasmonic channel. The controllable modulation of the surface charge density interacts with a dispersion characteristic of the surface plasmon propagating in the plasmonic channel to produce a phase modulation of the surface plasmon.

In some embodiments, the electric field comprises a first field component referred to as a bias field component. The bias field component forms the plasmonic channel. In particular, the bias field component establishes a bias point of the surface charge density. The surface charge density bias point is defined as a predetermined charge density that supports the surface plasmon at the semiconductor-insulator interface. In some embodiments, the bias field component is substantially constant in value or level and may be referred to as a 'direct current' (DC) field component. For example, an electric field level is selected that produces a sufficiently dense surface charge so that the plasmonic channel is created and the surface plasmon is able to propagate. The electric field with the selected strength is then applied and maintained in order to form and maintain the plasmonic channel.

In various embodiments, the electric field further comprises a second field component referred to as a modulation field component. The modulation field component comprises a varying electric field level about or around the electric field level established by the bias field component. In some embodiments, the modulation field component level may vary one or both of above and below the bias field component level. For example, the bias field component may establish an electric field at a first level (e.g., $E_1$). The modulation field component may be represented by a change in the electric field level (e.g., $\delta E$) that is one or both of a positive and a negative deviation in the electric field level around the first level (e.g., $E_1 \pm \delta E$).

In some embodiments, bias field component of electric field may facilitate operation of the plasmonic phase modulator as a binary switch with respect to the supported surface plasmon. Specifically, a controlled presence or absence of the surface charge produced by the bias field component is employed to essentially turn ON or turn OFF the plasmonic channel through the plasmonic phase modulator. When turned ON, the plasmonic channel formed by the presence of the surface charge essentially supports propagation of the surface plasmon and allows the surface plasmon to propagate through the plasmonic phase modulator. Alternatively, when turned OFF, the plasmonic channel effectively disappears (e.g., the surface charge is not present at the semiconductor-insulator interface) and propagation of the surface plasmon is blocked. In particular, the surface plasmon cannot propagate through the plasmonic phase modulator in the absence of the plasmonic channel provided by the surface charge. For example, the presence or absence of the plasmonic channel may be controlled by the presence or absence of the bias field component of the electric field.

In some embodiments, the surface charge comprises charge species or free carriers of the semiconductor that accumulate at the semiconductor-insulator interface under the influence of the electric field (i.e., in particular, under the influence of the bias field component of the electric field). In other words, the plasmonic phase modulator substantially operates in an 'accumulation' mode when considering the formation and maintenance of the plasmonic channel, in some embodiments. In some of these embodiments, the free carriers are electrons and the electric field creates what may be considered a 2-dimensional electron gas (2DEG) at the semiconductor surface. The 2DEG produced by the accumulation of free electrons acts as the plasmonic channel. In other words, the exemplary 2DEG is the surface charge that supports the surface plasmon within the plasmonic channel. Similarly, a 2-dimensional hole gas (2DHG) may be created by the accumulation of holes at the semiconductor surface.

In some embodiments, majority carriers of the semiconductor substrate provide the surface charge. For example, a semiconductor substrate, in which the majority carriers are electrons, may provide the surface charge as the 2DEG. For an exemplary semiconductor substrate in which the majority carriers are holes, the surface charge may be provided as a two dimensional hole gas (2DHG), for example. In other embodiments, the surface charge is provided by minority carriers of the semiconductor. In some embodiments, the semiconductor substrate may comprise a semiconductor layer or layers on top of an insulator layer. Such a semiconductor substrate may be referred to herein as a semiconductor on insulator (SOI) substrate.

In some embodiments, the plasmonic phase modulator has or employs an electrode adjacent to but electrically separated from the semiconductor surface (e.g., a surface of the semiconductor substrate). The electrode may be separated from the semiconductor surface by the insulator (e.g., of the semiconductor-insulator interface), for example. The electrode comprises a conductive material. In some of these embodiments, the electrode provides the electric field. In particular, the electrode may provide one or both of the bias field component and the modulation field component of the electric field. In some embodiments, a voltage is applied to the electrode produces the electric field. The conductive nature of the electrode accepts the voltage and produces the electric field that extends to the semiconductor surface. In other embodiments, one or both of the bias field component and the modulation field component of the electric field are provided by an external source (e.g., another electrode or a combination of electrodes and other electric field sources).

In some embodiments, the electrode may comprise a metal or a conductive metal oxide, a conductive metal nitride, or similar conductive compound comprising a metal. Essentially any metal or conductive metal compound may be employed. For example, the insulator may comprise a thin layer, and the metal may be deposited on a surface of the insulator as a layer using one or both of evaporative deposition and sputter deposition. In other embodiments, the electrode may comprise a doped semiconductor. For example, the doped semiconductor may be a layer of polysilicon that is heavily doped to act as a conductor. The polysilicon layer may be deposited or grown on the insulator layer, for example.

An optical signal may be one or both of coupled into and coupled out of the plasmonic phase modulator, according to various embodiments of the present invention. The optical signal coupled into plasmonic phase modulator excites the formation of the surface plasmon within the plasmonic channel of the plasmonic phase modulator. As such, a coupler that couples the optical signal into the plasmonic channel and excites the surface plasmon is a means for exciting the surface plasmon, according to some embodiments. In other embodiments, the means for exciting the surface plasmon may further comprise the optical signal and the coupler. In yet other embodiments, the means for exciting may directly excite the surface plasmon in the plasmonic channel (e.g., by electrical stimulation of the carrier gas, for example). The optical signal coupled out of the plasmonic phase modulator is produced from the surface plasmon and represents or carries the modulation that was imparted on the surface plasmon by the plasmonic phase modulator.

For example, an optical signal propagating in an optical waveguide or as a surface plasmon on a metal-based plasmonic waveguide adjacent to the plasmonic phase modulator may be coupled into the plasmonic phase modulator to excite the surface plasmon. In another example, an unguided optical beam (e.g., a free space optical beam) incident on an input end of the plasmonic phase modulator may be coupled into the plasmonic phase modulator and to excite the surface plasmon in the plasmonic channel. Similarly, the surface plasmon may be coupled out of the plasmonic phase modulator following modulation. For example, the modulated surface plasmon may be coupled out of the plasmonic phase modulator and into one of an optical waveguide and a plasmonic waveguide. In another example, the modulated surface plasmon may be coupled out of the plasmonic phase modulator as an unguided optical beam.

In some embodiments, a coupler is employed to one or both of couple the incident optical signal into and couple the modulated surface plasmon out of the plasmonic phase modulator. The coupler that couples the incident optical signal into (i.e., input coupler) essentially transforms a wave vector of the incident optical signal into a wave vector of the surface plasmon in the plasmonic channel of the plasmonic phase modulator. Likewise, the coupler that couples the surface plasmon out of the plasmonic phase modulator (i.e., output coupler) substantially transforms the surface plasmon wave vector into a wave vector associated with one or more of an optical waveguide, a plasmonic waveguide, and a free space optical beam.

The terms 'semiconductor' and 'semiconductor materials' as used herein independently include, but are not limited to, group IV, group III-V and group II-VI semiconductor materials from the Periodic Table of the Elements, including compound semiconductor materials, and combinations thereof, or another semiconductor material that forms any crystal orientation in lieu of or in combination with any of the semiconductor materials from the groups listed above. For example, and not by way of limitation, a semiconductor substrate may be a silicon-on-insulator (SOI) wafer with a (111)-oriented or a (110)-oriented silicon layer (i.e., top layer), or a single, free-standing wafer of (111) or (110) silicon, depending on the embodiment. The semiconductor materials that are rendered electrically conductive, according to some embodiments herein, are doped with a dopant material to impart a targeted amount of electrical conductivity (and possibly other characteristics) depending on the application.

An insulator or an insulator material useful for the various embodiments of the invention is any material that is capable of being made insulating including, but not limited to, a semiconductor material from the groups listed above, another semiconductor material, and an inherently insulating material (e.g., a dielectric). Moreover, the insulator material may be an oxide, a carbide, a nitride or an oxynitride of any of the above-referenced semiconductor materials such that insulating properties of the material are facilitated. For example, the insulator may be a silicon oxide ($SiO_x$). Alternatively, the insulator may comprise an oxide, a carbide, a nitride or an oxynitride of a metal (e.g., aluminum oxide) or even a combination of multiple, different materials to form a single insulating material, or the insulator may be formed from multiple layers of insulating materials.

A 'surface plasmon' is defined herein as a surface wave or a plasma oscillation of a surface charge at a surface of a plasmon supporting material adjacent to an insulator (e.g., a dielectric material or a vacuum). In particular, the surface plasmon is defined as a coherent oscillation of charged species at or closely associated with the semiconductor-insulator interface. The charged species that provide the surface charge comprises charges or carriers (e.g., electrons or holes) that are free to oscillate while still being essentially bound to the surface of the plasmon supporting material. For example, the surface plasmon may be the collective oscillations of a two dimensional electron gas (2DEG) in or at a surface of a semiconductor (i.e., the plasmon supporting material) adjacent to an overlying insulator. Surface plasmons are also referred to as surface plasmon polaritons especially when considering them in terms of a quasiparticle. A material is said to 'support' a surface plasmon and hence is a 'plasmon supporting material' if a bound surface charge exists or can exist at the surface of the material and if the bound surface charge provides for the formation the surface plasmon.

Further by definition, surface plasmons and by extension, plasmonic modes, are specifically confined to the surface of the plasmon supporting material at an interface between the plasmon supporting material and an overlying insulator material, as defined herein. However, while confined to the surface, the surface plasmon may propagate along the interface. As such, energy associated with the surface plasmon may be transferred along the plasmon supporting material from one point to another. For example, an optical signal incident from a vacuum or an overlying dielectric material on a surface of a surface plasmon supporting material may excite surface plasmons that propagate along the surface according to plasmonic modes associated with the material and a structure of the material.

Surface plasmons on the plasmon supporting material surface oscillate at the same frequency $\omega$ ($\omega = 2\pi f$) as the frequency of an incident optical field or another excitation source (e.g., another plasmon) used to excite the surface plasmons. However, surface plasmons are not generally constrained by a diffraction limitation in the optical domain. As such, a wavelength of a surface plasmon is generally shorter, and in some cases much shorter, than a wavelength of the incident optical field that excites the surface plasmon. In particular, surface plasmons are characterized by a wave vector $k_P$, which is related to a wavelength $\lambda_P$ of the surface plasmon by equation (1).

$$k_P = \frac{2\pi}{\lambda_P} \quad (1)$$

In turn, the surface plasmon wave vector $k_P$ is related to frequency $\omega$ by a dispersion characteristic or relation $\omega$–$k_P$ for the plasmon supporting material. The dispersion relation $\omega$–$k_P$ for the plasmon supporting material along with equation (1) establish how short the surface plasmon wavelength $\lambda_P$ is compared to a free space wavelength $\lambda_0$.

As noted above, surface plasmon supporting materials are materials that have or can support a surface charge that is free to oscillate and support the surface plasmon. Materials such as, but not limited to, metals and certain organometallics that exhibit a dielectric constant having a negative value real part are examples of plasmon supporting materials. Noble metals such as, but not limited to, gold (Au), silver (Ag) as well as some other metals, most notably copper (Cu) and aluminum, are materials that are known to support surface plasmons at or near to optical frequencies.

In metals (e.g., noble metals), the surface plasmon dispersion relation $\omega$–$k_P$ is given by equation (2)

$$k_{P,metal} = \frac{\omega}{c}\left[\frac{\varepsilon_m(\omega) \cdot \varepsilon_d}{(\varepsilon_m(\omega) + \varepsilon_d)}\right] \quad (2)$$

where c is the speed of light, $\varepsilon_m(\omega)$ is a complex dielectric constant of the metal and $\varepsilon_d$ is a dielectric constant of an insulator (i.e., a dielectric material) at an interface between the metal and the insulator where the surface plasmon is supported.

A semiconductor may also support a surface plasmon and thus is a plasmon supporting material. Specifically, in a semiconductor the surface plasmon is supported by a surface charge that forms a plasmonic channel. The surface plasmon dispersion relation for a semiconductor material in terms of the plasmon frequency $\omega_P$ may be given by equation (3)

$$\omega_P = \sqrt{\frac{q^2 N_S k_P}{m_0 \varepsilon_0}} \quad (3)$$

where $N_S$ is a two dimensional (2-D) surface charge density or 2-D carrier gas (2DCG) at the semiconductor-insulator interface (i.e., semiconductor surface), q is a charge of free carriers (e.g., the charge or either the electrons or holes) that comprise the surface charge, $m_0$ is an effective mass of a carrier (e.g., effective mass of an electron or a hole) in the semiconductor, and $\varepsilon_0$ is the free space permittivity. Using equation (3), phase velocity $v_P$ and group velocity $v_g$ of the surface plasmon in the plasmonic channel at the semiconductor surface is given by equations (4) and (5).

$$v_P = \frac{\omega_P}{k_P} = \sqrt{\frac{q^2 N_S}{m_0 \varepsilon_0 k_P}} \quad (4)$$

$$v_g = \frac{d\omega_P}{dk_P} = \frac{1}{2}\sqrt{\frac{q^2 N_S}{m_0 \varepsilon_0 k_P}} \quad (5)$$

An effective index of refraction of the 2DCG-based surface plasmon at the semiconductor-insulator interface can be derived from equation (4) as given by equation (6).

$$n_P = \frac{c}{v_P} \quad (6)$$

Further, using the above-relationships, a ratio of 2DCG-based surface plasmon effective refractive indices at two different surface charge densities is given by equation (7)

$$\frac{n_{P2}}{n_{P1}} = \frac{v_{P1}}{v_{P2}} = \frac{\sqrt{N_{S1}k_{P2}}}{\sqrt{N_{S2}k_{P1}}} = \frac{N_{S1}}{N_{S2}} \quad (7)$$

where numbered subscripts having either '1' or '2' (e.g., p1, p2, s1, s2) refer respectively to the two different charge densities and where it is assumed that a fixed surface plasmon frequency $\omega_P$ is employed. In particular, if the surface plasmon frequency $\omega_P$ is held constant for the two different charge densities $N_{S1}$ and $N_{S2}$, then from equation (3) it can be shown that $\sqrt{N_{S1}k_{P1}} = \sqrt{N_{S2}k_{P2}}$ which leads directly to the result in equation (7). Namely, a change in the effective index of refraction $\Delta n_P$ of the surface plasmon at the semiconductor-insulator interface is proportional to a change in the surface charge density $\Delta N_S$, as given by equation (8).

$$\frac{\Delta n_P}{n_{P1}} = \frac{\Delta N_S}{N_{S2}} \quad (8)$$

Further, a change in the effective index of refraction $\Delta n_P$ that provides a phase change of $\pi$-radians (180 degrees) within the plasmonic phase modulator is given by equation (9)

$$\Delta n_P = \frac{\lambda_0}{2L} \quad (9)$$

where $\lambda_0$ is the free-space operating wavelength and L represents a length of the plasmonic channel of the plasmonic phase modulator. For example, if the plasmonic channel has a length L of 100 nm and assuming a free-space optical wavelength $\lambda_0$ of 1550 nm, an exemplary effective index change $\Delta n_P$ of about 7.75 will provide a phase change of $\pi$-radians. From equation (8) and assuming an initial (i.e., bias point) surface charge density $N_S$ of $5 \times 10^{13}$ cm$^{-2}$, the exemplary effective index change $\Delta n_P$ of 7.75 can be provided by a change in surface charge density $\Delta N_S$ of about $2 \times 10^{12}$ cm$^{-2}$ (i.e., less than 4% change from the bias point surface charge density $N_S$).

In various embodiments, the change in the surface charge density is controlled or provided by the modulation field component of the electric field. A modulation voltage applied to the electrode, for example, may provide the modulation field component. Similarly, the bias field component may be provided by a bias component of a voltage applied to the electrode, according to some embodiments. When an applied voltage provides the electric field, the plasmonic phase modulator of the present invention is a voltage-controlled plasmonic phase modulator.

In embodiments of the voltage-controlled plasmonic phase modulator, a bias voltage $V_B$ on the electrode sufficient to provide the bias component of the electric field that forms and maintains an exemplary plasmonic channel may be determined from equation (10)

$$V_B = \frac{qN_S}{C_I} + \frac{2KT}{q}\ln\left(\frac{qN_S}{Q_0}\right) \quad (10)$$

where $C_I$ is an insulator layer capacitance associated with the electrode (i.e., of a capacitor formed by the electrode and semiconductor surface separated by the insulator), $Q_0$ is a surface charge that provides a flat band condition in the semiconductor, and KT/q is the thermal voltage of the semiconductor. In equation (10), a first term (i.e., left of the addition operator or '+') is a voltage drop across the insulator (or insulator layer) while a second term (i.e., to the right of the '+') represents a potential drop across an accumulation layer that forms the plasmonic channel. Similarly, a modulation voltage $V_{mod}$ that provides the bias field component is similarly given by equation (11).

$$V_{mod} = \frac{q\Delta N_S}{C_I} + \frac{2KT}{q}\ln\left(\frac{N_{S1}}{N_{S2}}\right) \quad (11)$$

However, since the change in surface charge density $\Delta N_S$ sufficient to provide the $\pi$-radian phase change is very small compared to the bias point surface charge $N_S$, a ratio of $N_{S1}/N_{S2}$ is about 1 and the modulation voltage is effectively a function of only the first term to the left of the addition operator '+'. For example, for the exemplary change in surface charge density $\Delta N_S \sim 2 \times 10^{12}$ cm$^{-2}$ from above and assuming an exemplary insulator layer capacitance $C_1$ of about $1.33 \times 10^{-5}$ F/cm$^2$, a modulation voltage $V_{mod}$ of about 20 mV may be sufficient to provide the $\pi$-radian phase change in a surface plasmon propagating through the plasmonic phase modulator of the present invention.

For simplicity herein, no distinction is made between a substrate or slab and any layer or structure on the substrate unless such a distinction is necessary for proper understanding. Also, herein '2-dimensional carrier gas (2DCG)' is defined as and used to refer to one or both of a 2-dimensional electron gas (2DEG) and a 2-dimensional hole gas (2DHG). Further, as used herein, the article 'a' is intended to have its ordinary meaning in the patent arts, namely 'one or more'. For example, 'a layer' generally means 'one or more layers' and as such, 'the layer' means 'the layer(s)' herein. Also, any reference herein to 'top', 'bottom', 'upper', 'lower', 'up', 'down', 'left' or 'right' is not intended to be a limitation herein. Moreover, examples herein are intended to be illustrative only and are presented for discussion purposes and not by way of limitation.

Figure 2:
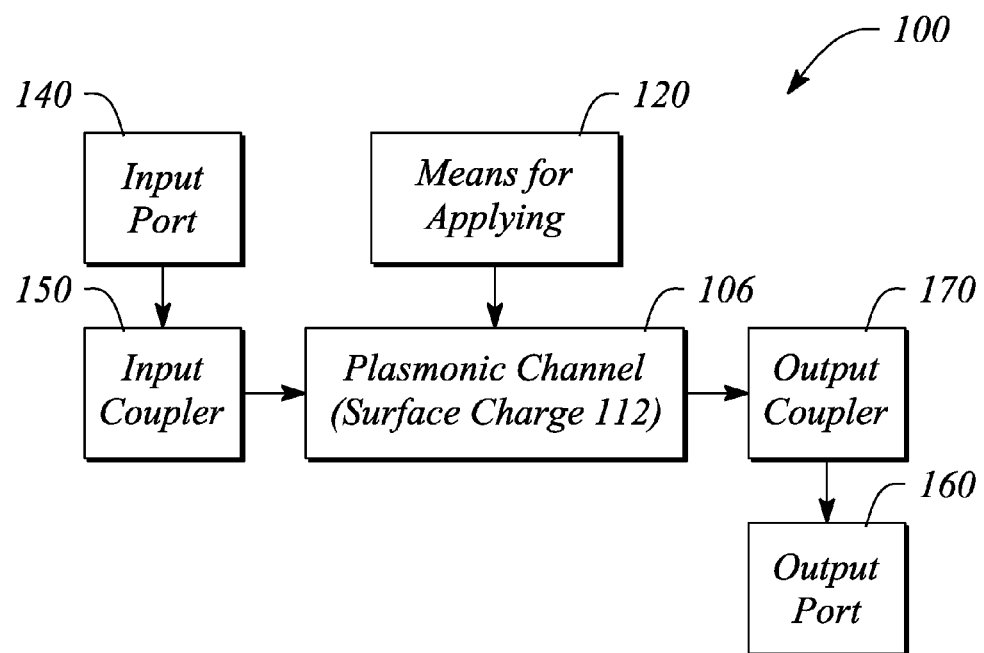
FIG. 2 illustrates a block diagram of the plasmonic phase modulator of FIG. 1, according to an embodiment of the present invention.

FIG. 1 illustrates a cross sectional view of a plasmonic phase modulator 100, according to an embodiment of the present invention. FIG. 2 illustrates a block diagram of the plasmonic phase modulator 100, according to an embodiment of the present invention. The plasmonic phase modulator 100 modulates a phase of a surface plasmon. The surface plasmon generally propagates from an input end 102 to an output end 104 of the plasmonic phase modulator 100 along a path referred to as a plasmonic channel 106. At the input end 102, the surface plasmon is referred to as an 'unmodulated' surface plasmon. At the output end 104, the surface plasmon has been modulated by the plasmonic phase modulator 100 and is termed a 'modulated' surface plasmon.

The plasmonic phase modulator 100 comprises a semiconductor substrate 110. The semiconductor substrate 110 is configured to provide a surface charge 112 at a surface 114 of the semiconductor substrate 110. The surface charge 112 supports the surface plasmon. In particular, the surface charge 112 forms the plasmonic channel 106 which, in turn, supports the surface plasmon that propagates therethrough. In some embodiments (e.g., as illustrated in FIG. 1), the semiconductor substrate 110 is essentially planar.

For example, the semiconductor substrate 110 of the plasmonic phase modulator 100 may comprise a semiconductor of group IV such as, but not limited to, one or both of silicon (Si) and germanium (Ge). In another example, the semiconductor substrate 110 may comprise a III-V compound semiconductor such as, but not limited to, gallium arsenide (GaAs) or indium phosphide (InP). The semiconductor substrate 110 may be doped with a dopant to increase an available quantity of free carriers (e.g., electrons or holes). For example, Si doped with an n-type dopant such as, but not limited to, phosphorous (P) may be used as the semiconductor substrate 110 to provide surface electrons in the form of a 2DEG for supporting the surface plasmon. In another example, the semiconductor substrate 110 may be effectively undoped (e.g., unintentionally or lightly doped) or intrinsic.

The surface charge 112 comprises free charges or carriers of the semiconductor substrate 110. In some embodiments, the carriers represent majority carriers of the semiconductor substrate 110. The carriers may be 'naturally' present in sufficient quantity or at a sufficient density that provides the surface charge 112 and creates the plasmonic channel 106, in some embodiments. For example, the sufficient density, and thus the surface charge 112, may be provided by the presence of a dopant at a predetermined concentration in the semiconductor substrate 110. The exemplary surface charge 112 provided by the dopant that produces accumulated carriers at the surface 114 may be modulated (e.g., changed in density) by the application of an electric field or another means for modulating that essentially moves some of the carriers away from the surface 114, for example.

In other embodiments, the surface charge 112 and, by extension, the plasmonic channel 106 are provided by the substrate carriers that are attracted to and subsequently accumulated at the surface 114. For example, an electric field may be employed to attract and accumulate majority carriers to the surface 114 of the semiconductor substrate 110 to provide the surface charge 112. In these embodiments, the plasmonic phase modulator 100 substantially operates in an accumulation mode.

In general, the accumulated surface charge 112 at the surface represents a two-dimensional electron gas (2DEG) when the majority carriers are electrons and a two-dimensional hole gas (2DHG) when the majority carriers are holes. For example, the substrate may be silicon (Si) that is either intrinsic or lightly doped with an n-type dopant. For such an exemplary semiconductor substrate 110, the majority carriers are electrons and the surface charge 112 is essentially a 2DEG.

In other embodiments, the surface charge 112 comprises minority carriers. For example, the surface charge 112 may be provided by a surface inversion charge induced by migration of thermally generated minority carriers to the surface 114 of the semiconductor substrate 110 wherein the minority carriers achieve a sufficiently high density to overwhelm a majority carrier density at the surface 114. By overwhelming the majority carrier density, the minority carriers essentially invert the surface charge type.

In some embodiments, the plasmonic phase modulator 100 further comprises an electrode 120 adjacent to but spaced apart from the semiconductor substrate surface 114. The electrode 120 comprises a conductive material and provides the electric field. The electric field provided by the electrode 120 influences a density of the surface charge 112 provided by the semiconductor substrate 110. In particular, the electric field comprising a bias field component and a modulation field component, in some embodiments.

In some embodiments, the bias component of the electric field influences the surface charge density by inducing formation of the plasmonic channel 106 comprising the surface charge 112. For example, the electric field may attract carriers to the surface of the semiconductor substrate 110. The attracted carriers accumulate at the semiconductor substrate surface 114 to form the plasmonic channel 106. Continued presence of the bias component further maintains the plasmonic channel 106 facilitating propagation of the surface plasmon therethrough. In some embodiments, such as when the semiconductor substrate 110 is essentially planar, the electrode 120 is also essentially planar (e.g., see FIG. 1).

In some embodiments, the modulation component of the electric field varies or modulates a phase of the surface plasmon propagating in the plasmonic channel 106. The surface plasmon phase is a function of the modulation field component as has been established above. In particular, a change in the phase is controlled by a change in the effective index of refraction $\Delta n_P$ which is a function of (i.e., is proportional to) a change in the surface charge density $\Delta N_S$, as given by equation (8), in some embodiments. The modulation field component determines the change in surface charge density $\Delta N_S$.

In some embodiments, the electrode 120 comprises a metal. For example, the electrode 120 may comprise one or more of gold (Au), silver (Ag), copper (Cu), titanium (Ti), and tungsten (W), as well as various combinations and alloys thereof. In other embodiments, the electrode 120 comprises the metal and another material alloyed with or chemically bonded to the metal. For example, the electrode 120 may comprise a conductive oxide or a nitride of the metal. In yet other embodiments, the electrode 120 comprises a doped semiconductor. For example, the electrode 120 may comprise polysilicon (p-Si) that is doped with sufficient dopant to render the polysilicon electrically conductive. Essentially any conductive material that is or can be employed to fabricate conductive traces or contact pads for semiconductor integrated circuits (ICs) may be employed to realize the electrode 120, for example.

In some embodiments, the electrode 120 is connected to a voltage source (not illustrated) that acts as the control input. The voltage source provides a voltage to the electrode 120 such that the voltage produces an electric field. The voltage source is configured to provide a bias voltage that produces the bias component of the electric field. The voltage source is independently configured to provide a modulation voltage that produces the modulation field component of the electric field. For example, the bias voltage and modulation voltage may be determined according to equations (10) and (11) above.

According to some embodiments, the plasmonic phase modulator 100 includes means for applying a variable electric field that comprises the electrode 120 with the attached voltage source. In another embodiment, the means for applying a variable electric field may comprise a pair of electrodes (not illustrated) connected to a pair of voltage sources. A first electrode of the electrode pair in conjunction with a first voltage source of the voltage source pair may provide the bias field component, for example. Similarly, a second electrode and second voltage source of the respective pairs may provide the modulation field component, for example. In yet another embodiment, the electric field or more particularly, one or both of the modulation field component and the bias field component of the electric field may be provided by another electric field generator instead of or in addition to a combination of an electrode and a voltage source. FIG. 2 illustrates the means for applying 120 in accordance with some embodiments.

The plasmonic phase modulator 100 further comprises an insulator 130. The insulator 130 is located between and spaces apart the electrode 120 and the semiconductor substrate 110. The surface plasmon is supported at an interface between the semiconductor surface 114 and the insulator 130 (i.e., the semiconductor-insulator interface). The semiconductor-insulator interface corresponds to the substrate surface 114 herein.

In some embodiments, the insulator 130 comprises a planar layer on the semiconductor surface 114. In some of these embodiments, the insulator 130 may comprise a relatively thin layer of a dielectric. Further, in some of these embodiments, the dielectric may be a high-k dielectric. A high-k dielectric is defined herein as a dielectric material having a dielectric constant that is higher than that of silicon dioxide ($SiO_2$). Examples of high-k dielectrics include, but are not limited to, hafnium oxide ($HfO_2$), zirconium oxide ($ZrO_2$) and zirconium silicate ($ZrSi_4$). In general, a thickness of the insulator 130 and a dielectric constant of the insulator are selected to facilitate achieving a particular electric field level or intensity at the semiconductor surface 114 for a given voltage that is applied to the electrode 120.

For example, the insulator 130 may comprise a dielectric having a thickness of less than about 2 nanometers (nm) and a dielectric constant of greater than about 10. In another example, the dielectric constant may be greater than or equal to about 30. When the insulator 130 has a thickness of between about 1 nm and about 2 nm and a dielectric constant of about 30, for example, an applied voltage on the electrode 120 of about 4 volts (V) may produce an accumulated density of the surface charge 112 at the surface 114 of an exemplary Si semiconductor substrate 110 of about $10^{14}$ $cm^{-2}$. A surface charge density of about $10^{14}$ $cm^{-2}$ would result in a plasmon wavelength $\lambda_p$, of about 14 nm when excited by optical radiation having a free space of wavelength of about 1.55 microns ($\mu m$), for example. Further, an exemplary 20 mV modulation voltage may be sufficient to change the surface plasmon phase by $\pi$-radians. An R-C time constant for such an exemplary plasmonic phase modulator 100 may support a modulation bandwidth on the order of about 160 GHz, in some embodiments.

In some embodiments, the plasmonic phase modulator 100 further comprises an input port 140 at the input end 102 of the plasmonic phase modulator 100 as shown in FIG. 2. The input port 140 essentially provides means for introducing a signal from an external source into the plasmonic channel 106 of the plasmonic phase modulator 100. The signal may be either an optical signal or plasmonic signal (i.e., also essentially an optical signal), for example. In some embodiments, the plasmonic phase modulator 100 further comprises an input coupler 150. The input coupler 150 converts a wave vector of the signal at the input port 140 into a wave vector $k_P$ of the surface plasmon supported by the surface charge 112 that forms the plasmonic channel 106. The input coupler 150 is positioned adjacent to the input end 102 of the plasmonic phase modulator 100.

For example, the input port 140 may comprise an optical beam 140 and the input coupler 150 may comprise a grating 150 positioned adjacent to the input end 102 of the plasmonic phase modulator 100. The grating 150 receives the incident optical beam 140 and couples energy of the optical beam 140 into the plasmonic phase modulator 100 as the surface plasmon. In particular, the optical grating 150 converts a wave vector of the optical beam into the wave vector $k_P$ of the surface plasmon.

In another example, the input port 140 comprises an optical waveguide that carriers an optical signal. For example, the optical waveguide may be a slab waveguide (e.g., a ridge waveguide) in a portion of the semiconductor substrate 110 beyond or external to the plasmonic phase modulator 100. An end of the optical waveguide positioned adjacent to the input end 102 of the plasmonic phase modulator 100 provides the input port 140. The input coupler 150 is positioned between the end of the input port optical waveguide 140 and the input end 102 of the plasmonic phase modulator 100. For example, the input coupler 150 may be a gap 150 having a predetermined width across which an evanescent field extends to couple the optical signal into the surface plasmon of the plasmonic phase modulator 100.

In yet another example, the input port 140 comprises a plasmonic waveguide that carriers a surface plasmon having a wave vector characteristic of the plasmonic waveguide. For example, the plasmonic waveguide may comprise a strip of a noble metal on a surface of the semiconductor substrate 110 beyond the input end 102 of the plasmonic phase modulator 100. An end of the plasmonic waveguide provides the input port 140. The input coupler 150 for this example, essentially converts the wave vector surface plasmon of the plasmonic waveguide into the wave vector $k_P$ of the surface plasmon of the plasmonic phase modulator 100. In other words, the input coupler 150 provides for a transitioning of the surface plasmon guided on the noble metal strip to the surface plasmon that propagates on the surface charge 112 within the plasmonic channel 106 of the plasmonic phase modulator 100.

In some embodiments, the plasmonic phase modulator 100 further comprises an output port 160. The output port 160 essentially provides means for receiving and carrying away the modulated surface plasmon from the plasmonic channel 106 of the plasmonic phase modulator 100. For example, the received modulated surface plasmon may be carried away from the plasmonic phase modulator 100 as either an optical signal or plasmonic signal. In various embodiments, the output port 160 may be essentially similar to one or more of the exemplary input ports 140, described above. For example, the output port 160 may comprise one of an optical waveguide and a plasmonic waveguide.

In some embodiments, the plasmonic phase modulator 100 further comprises an output coupler 170. The output coupler 170 converts the wave vector $k_P$ of the modulated surface plasmon in the plasmonic channel 106 into a wave vector compatible with the output port 160. The output coupler 170 is positioned adjacent to the output end 104 of the plasmonic phase modulator 100. In various embodiments, the output coupler 170 may be essentially similar to any of the exemplary input couplers 150, described above. For example, the output coupler 170 may comprise a grating that converts the surface plasmon of the plasmonic phase modulator 100 into an output optical beam.

Figure 3:
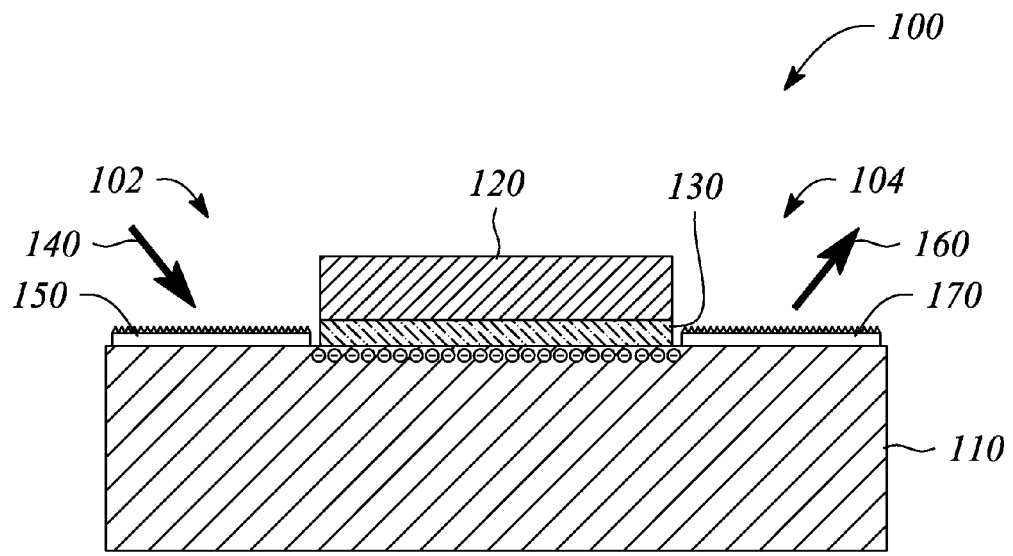
FIG. 3 illustrates a cross sectional view of an exemplary embodiment of the plasmonic phase modulator of FIG. 1 that employs gratings as input and output couplers, according to an embodiment of the present invention.
Figure 4:
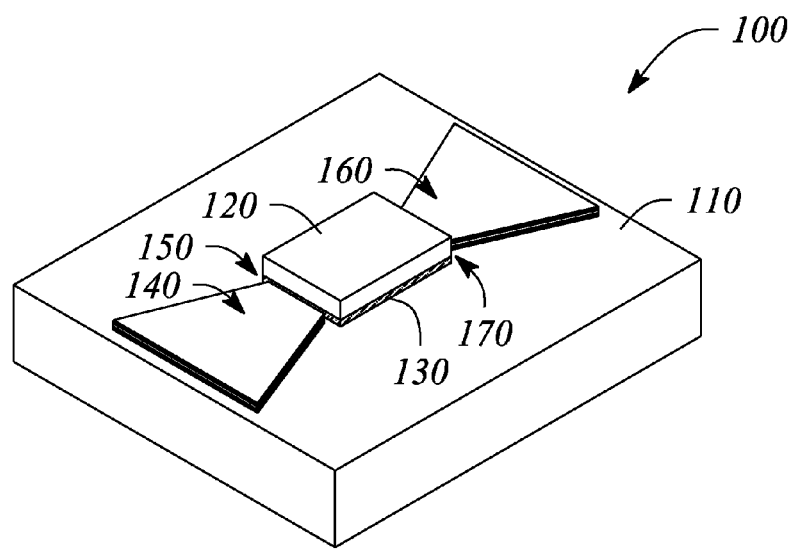
FIG. 4 illustrates a perspective view of an exemplary embodiment of the plasmonic phase modulator of FIG. 1 with input and output ports provided by plasmonic waveguides, according to an embodiment of the present invention.

FIG. 3 illustrates a cross sectional view of an exemplary embodiment of the plasmonic phase modulator 100 of FIG. 1 that employs gratings as both the input coupler 150 and the output coupler 170, according to an embodiment of the present invention. Illustrated bold arrows 140, 160 in FIG. 3 depict input and output optical beams that act as respectively as input and output ports 140, 160. FIG. 4 illustrates a perspective view of an exemplary embodiment of the plasmonic phase modulator 100 of FIG. 1 comprising both the input coupler 150 and the output coupler 170 that are provided by tapered metal-insulator-metal (MIM) plasmonic waveguides, according to an embodiment of the present invention.

Figure 5:
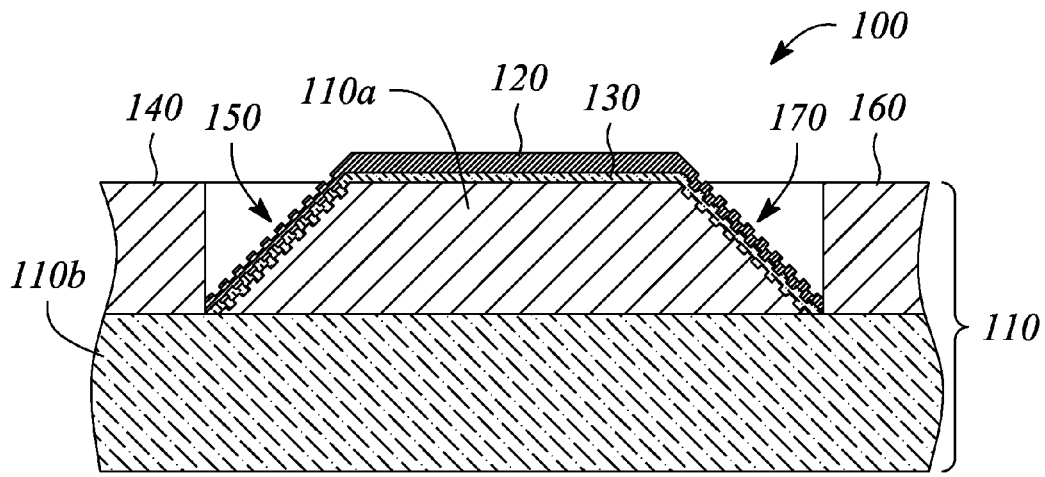
FIG. 5 illustrates a cross sectional view of an exemplary embodiment of the plasmonic phase modulator, according to yet another embodiment of the present invention.

FIG. 5 illustrates a cross sectional view of an exemplary embodiment of the plasmonic phase modulator 100, according to yet another embodiment of the present invention. In particular, as illustrated, the plasmonic phase modulator 100 comprises the semiconductor substrate 110, an electrode 120 and an insulator layer 130 sandwiched between the electrode 120 and the semiconductor substrate 110. As illustrated, the semiconductor substrate 110 is a semiconductor-on-insulator (SOI) substrate. For example, the SOI substrate may comprise a semiconductor layer 110a of silicon (Si) on top of an insulating layer 110b of silicon dioxide (SiO$_2$). In this exemplary configuration, the semiconductor substrate 110 that provides the plasmonic channel and supports the surface plasmon may comprise a portion of the Si semiconductor layer 110a under the electrode 120, for example.

Further as illustrated, the input port 140 is provided by an input portion of an optical waveguide 140, while another portion of an optical waveguide 160 provides the output port 160. For example, one or both of the input optical waveguide 140 and the output optical waveguide 160 may be a strip optical waveguide (i.e., a photonic wire waveguide) formed in the semiconductor layer 110a of the SOI substrate 110. Other optical waveguides including, but not limited to, a slot optical waveguide and a ridge optical waveguide may be employed instead of a strip waveguide for the input and output optical waveguides 140, 160.

Further as illustrated in FIG. 5, the plasmonic phase modulator 100 further comprises an input coupler 150 implemented as a sloped grating coupler 150. Also as illustrated, the plasmonic phase modulator 100 further comprises an output coupler 170 realized as another sloped grating coupler. In another embodiment (not illustrated), one or both of the input and output couplers 150, 170 may be implemented as a plasmonic taper. A plasmonic taper comprise a vertically stacked metal-insulator-metal plasmonic waveguide that is adiabatically tapered from a dimension close to that of the optical waveguide to a deep sub-wavelength dimension at an opposite end adjacent to the electrode 120 of the plasmonic phase modulator 100. In particular, the deep sub-wavelength dimension may be similar to a width of the electrode 120 perpendicular to a direction of propagation of the surface plasmon within the plasmonic phase modulator 100.

Herein, a sloped grating coupler comprises a sloped surface of the semiconductor layer 110a, wherein the coupler is formed into the semiconductor layer (e.g., by etching) of the SOI substrate 110. The sloped surface comprises an ultra-fine grating that is formed therein. In an example, the ultra-fine grating may have a pitch of about 16 nm for a first order diffraction or about 22 nm for a second order diffraction when it is interfaced to an Si strip optical waveguide that has an optical mode with an effective wavelength of about 440 nm. In some embodiments, the ultra-fine grating is also formed in a layer of insulator and a layer of conductor that overlies the grating of the semiconductor material (e.g., as illustrated). The conductor may be material used to form the electrode 120 (e.g., metal or doped-polysilicon) while the insulator may be an extension of the insulator 130. Coupling between the ultrafine grating and the surface plasmon within the plasmonic channel of the plasmonic phase modulator 100 is governed by equation (12)

$$\frac{2\pi}{\lambda_P} = \frac{2\pi \cos\theta}{\lambda_0} + \frac{2m\pi}{\Lambda} \quad (12)$$

where m is a diffraction order, $\Lambda$ is a grating period and, $\theta$ is the grating slope as illustrated in FIG. 5. In some embodiments, an area above and between the ultra-fine grating of the sloped grating coupler 150, 170 and an interfaced optical waveguide (e.g., the input or output optical waveguides 140, 160) comprises a relatively high index dielectric fill material. The relatively high index dielectric fill material has an index of refraction that is higher than or relative to an index of refraction of the semiconductor. For example, the relatively high index dielectric fill material may have a refractive index of about 3-4 when the semiconductor is Si.

In some embodiments, the plasmonic phase modulator 100 according to the present invention may be employed to implement an amplitude modulator. For example, in some embodiments, switching on and off or varying a level of the bias field component may be used to amplitude modulate the surface plasmon propagating in the plasmonic channel. In another embodiment (not illustrated), the plasmonic phase modulator may be used in a Mach-Zehnder configuration as an amplitude modulator to modulate an amplitude of an optical signal coupled into and out of the plasmonic channel. In particular, the plasmonic phase modulator may be positioned in one of two parallel optical paths of a Mach-Zehnder interferometer. Switching a phase of an optical signal using the plasmonic phase modulator between 0-radians (0 degrees) and π-radians (180 degrees) will provide an ON-OFF modulation of an optical signal passing through the Mach-Zehnder interferometer. Advantageously, a length of the plasmonic phase modulator according to some embodiments of the present invention is much smaller (i.e., shorter) than conventional phase modulator that is normally used with Mach-Zehnder configurations for amplitude modulation.

Figure 6:
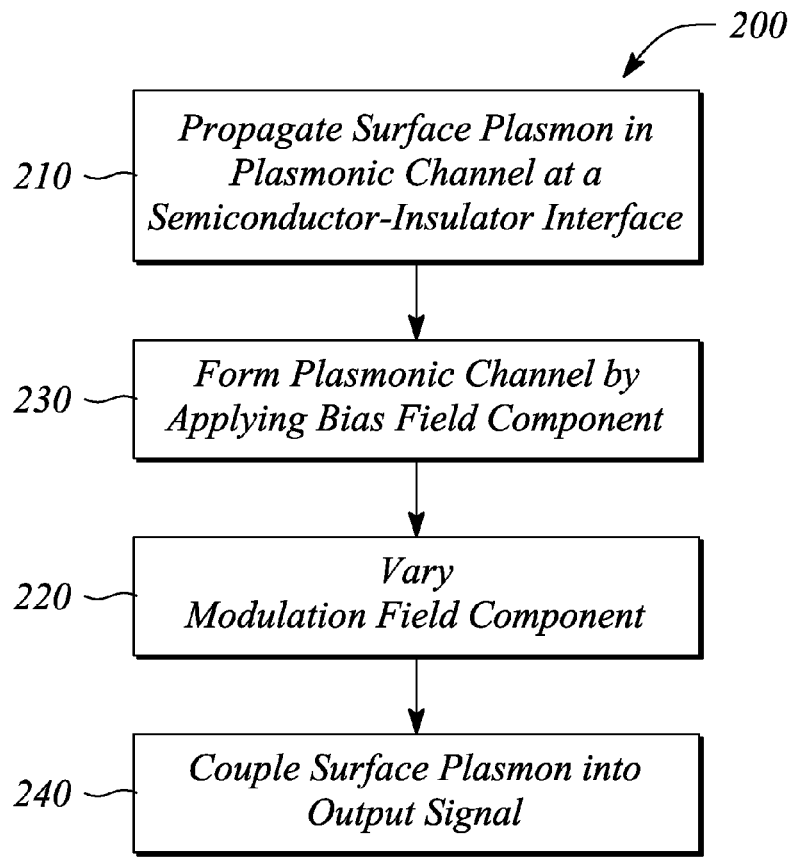
FIG. 6 illustrates a flow chart of a method of modulating a surface plasmon, according to an embodiment of the present invention.

FIG. 6 illustrates a flow chart of a method 200 of phase modulating a surface plasmon, according to an embodiment of the present invention. The method 200 of phase modulating a surface plasmon comprises propagating 210 a surface plasmon in a plasmonic channel at an interface between an insulator and a surface of a semiconductor adjacent to the insulator. In some embodiments, the plasmonic channel comprises an accumulated surface charge at the semiconductor-insulator interface. In various embodiments, the insulator may be either a material comprising a dielectric (i.e., a dielectric) or a vacuum. For example, the provided semiconductor substrate may be a silicon (Si) substrate that has a surface coated with a layer of a dielectric insulator material such as, but not limited to, silicon dioxide ($SiO_2$), hafnium oxide ($HfO_2$), zirconium oxide ($ZrO_2$) and zirconium silicate ($ZrSi_4$).

The method 200 of phase modulating a surface plasmon further comprises varying 220 a modulation field component of an electric field that modulates a density of the accumulated surface charge about a bias point. The bias point is defined as a density of the accumulated surface charge that establishes and maintains the plasmonic channel at a level sufficient to support the propagating surface plasmon. Modulating the surface charge density in the plasmonic channel by varying 22 the modulation field component modulates a phase of the propagating surface plasmon.

In some embodiments, the method 200 of phase modulating a surface plasmon further comprises forming 230 the plasmonic channel by applying a bias component of the electric field. The bias field component accumulates the surface charge at the semiconductor-insulator interface. In particular, the bias field component determines the bias point. In some embodiments, the surface charge comprises a 2-dimensional electron gas (2DEG). In other embodiments, the surface charge comprises a 2-dimensional hole gas (2DHG).

In some embodiments, a voltage that is applied to an electrode provides one or both of the bias field component and the modulation field component. The electrode is adjacent to a side of the insulator that is opposite a side adjacent to the semiconductor. In some embodiments, the electrode comprises a doped semiconductor. In other embodiments, the electrode comprises another conductive material such as, but not limited to, metal. For example, the electrode may comprise any of the materials described above for the electrode 120 of the plasmonic phase modulator 100. In some embodiments, the voltage comprises a bias voltage. In some embodiments, the voltage further comprises a modulation voltage.

In some embodiments, the method 200 of phase modulating a surface plasmon further comprises coupling (not illustrated) an incident signal (e.g., optical signal or plasmonic signal) into the surface plasmon before varying 220 the modulation field component. Coupling an incident signal before varying 220 the modulation field component provides a conversion between a wave vector of the incident signal and a wave vector of the surface plasmon. For example, coupling may comprise employing the input coupler 150 in conjunction with the input port 140 described above with respect to the plasmonic phase modulator 100.

In some embodiments, the method 200 of modulating a surface plasmon further comprises coupling 240 the surface plasmon into an output signal (e.g., an optical signal or a plasmonic signal) after varying 220 the modulation field component. Coupling 240 the surface plasmon after varying 220 provides a conversion between the wave vector of the surface plasmon and a wave vector of the output signal. Coupling 240 the surface plasmon may comprise employing the output coupler 170 in conjunction with the output port 160 described above with respect to the plasmonic phase modulator 100, for example.

Thus, there have been described embodiments of a plasmonic phase modulator and a method of phase modulating a surface plasmon employing a modulated surface charge at a semiconductor-insulator interface. It should be understood that the above-described embodiments are merely illustrative of some of the many specific embodiments that represent the principles of the present invention. Clearly, those skilled in the art can readily devise numerous other arrangements without departing from the scope of the present invention as defined by the following claims.

What is claimed is:

1. A plasmonic phase modulator comprising:
a semiconductor substrate configured to provide a surface charge at a surface of the semiconductor substrate, the surface charge forming a plasmonic channel that supports a surface plasmon;
an electrode configured to provide an electric field that influences the surface charge, the electric field comprising a bias field component and a modulation field component; and
an insulator between the electrode and the semiconductor substrate, the surface plasmon being supported within the plasmonic channel at an interface between the semiconductor substrate surface and the insulator;
wherein a phase of the surface plasmon in the plasmonic channel is modulated by changes in the electric field.

2. The plasmonic phase modulator of claim 1, wherein the surface charge comprises majority carriers of the semiconductor substrate that accumulate at the semiconductor substrate surface to form the plasmonic channel, a strength of the surface plasmon within the plasmonic channel being a function of the bias field component of the electric field.

3. The plasmonic phase modulator of claim 1, where the phase of the surface plasmon within the plasmonic channel is a function of the modulation field component.

4. The plasmonic phase modulator of claim 1, further comprising a voltage source electrically connected to apply a voltage to the electrode such that the electric field is produced, the voltage source being configured to provide a bias voltage that produces the bias field component of the electric field and independently being configured to provide a modulation voltage that produces the modulation field component of the electric field.

5. The plasmonic phase modulator of claim 1, wherein the electrode comprises a doped semiconductor.

6. The plasmonic phase modulator of claim 5, wherein the doped semiconductor of the electrode comprises polysilicon, and wherein the semiconductor substrate comprises silicon.

7. The plasmonic phase modulator of claim 1, wherein both the insulator and the electrode are essentially planar layers on the semiconductor surface, the insulator planar layer comprising a dielectric having a thickness of less than about 2 nanometers and having a dielectric constant that is equal to or greater than about 30.

8. The plasmonic phase modulator of claim 1, further comprising:
an input port comprising one of an optical waveguide, a plasmonic waveguide, and an unguided optical beam;

a coupler that converts a wave vector of the input port into a wave vector of the surface plasmon supported by the surface charge;

an output port comprising one of an optical waveguide, a plasmonic waveguide, and an unguided optical beam; and a coupler that converts a wave vector of the surface plasmon into a wave vector of the output port, wherein a signal incident at the input port is coupled by the coupler into the plasmonic phase modulator as the surface plasmon.

9. The plasmonic phase modulator of claim 1, further comprising a Mach-Zehnder configuration to modulate an amplitude of an optical signal coupled into and out of the plasmonic channel.

10. A plasmonic phase modulator comprising:

a plasmonic channel in a surface of a semiconductor substrate at an interface between the semiconductor substrate and an insulator, the plasmonic channel supporting a surface plasmon; and means for applying a variable electric field, the electric field varying a density of a 2-dimensional carrier gas (2DCG) at the semiconductor-insulator interface to modulate a phase of the surface plasmon, wherein the plasmonic channel comprises the 2-dimensional carrier gas (2DCG) at the semiconductor-insulator interface.

11. The plasmonic phase modulator of claim 10, wherein the means for applying comprises an electrode separated from the surface of the semiconductor substrate by the insulator, the electrode providing the electric field that varies a density of the 2DCG about a bias point of the plasmonic channel to modulate the surface plasmon phase.

12. The plasmonic phase modulator of claim 11, wherein the electrode comprises a doped semiconductor adjacent to a side of the insulator opposite a side of the insulator that forms the interface with the semiconductor substrate surface.

13. The plasmonic phase modulator of claim 11, wherein the means for applying further induces formation of the 2DCG at the surface by attracting majority carriers of the semiconductor substrate to the surface, the majority carriers accumulating at the surface as the 2DCG.

14. The plasmonic phase modulator of claim 11, further comprising:

means for input coupling an incident optical signal to the plasmonic phase modulator, the means for input coupling providing a wave vector conversion between a wave vector of the incident optical signal and a wave vector of the surface plasmon supported by the 2DCG; and means for output coupling an output optical signal from the plasmonic phase modulator, the means for output coupling providing a wave vector conversion between the wave vector of the surface plasmon and a wave vector of the output optical signal, wherein the output optical signal comprises a modulated version of the input optical signal.

15. The plasmonic phase modulator of claim 14, wherein one or both of the means for input coupling and the means for output coupling comprise a sloped grating coupler.

* * * * *